United States Patent [19]
Wilson et al.

[11] 3,816,092
[45] June 11, 1974

[54] HERBICIDAL 3,1-DICHLOROANILIDES
[75] Inventors: Harold F. Wilson, Moorestown, N.J.; Dougal H. McRay, Hatboro, Pa.
[73] Assignee: Rohm & Haas Company, Philadelphia, Pa.
[22] Filed: Mar. 16, 1961
[21] Appl. No.: 96,089

Related U.S. Application Data
[60] Division of Ser. No. 31,253, May 24, 1960, abandoned, which is a continuation-in-part of Ser. No. 714,947, Feb. 13, 1958, abandoned.

[52] U.S. Cl. ................................................. 71/118
[51] Int. Cl. ............................................ A01n 9/20
[58] Field of Search ................ 71/2.3, 118; 260/562

[56] References Cited
UNITED STATES PATENTS
2,849,465   8/1958   Randall et al. ...................... 260/562
FOREIGN PATENTS OR APPLICATIONS
1,005,784   9/1957   Germany .............................. 71/118

OTHER PUBLICATIONS
Plant Regulators, CDCC Positive Data Series, No. 2, June 1955, National Research Council, Pages a, b, c, 1, 39 & 40.
King, Insecticides and Repellents, Agri. Handbook, No. 69, Page 285, USDA, (1954).
Reilstein Handbuch der Organischen Chemie, Vol. 12, 4th Edition, Pages 622–629.
Takematsu et al., Fundamental Studies Relating to Control of Weeds in Farm Land, 1/1959.

Primary Examiner—James O. Thomas, Jr.
Attorney, Agent, or Firm—Connolly and Hutz

[57] ABSTRACT

Disclosed is a method for selectively inhibiting growth of undesirable plants in an area containing growing undesirable plants in an established crop, which comprises applying to said area 3,4-dichloropropionanilide at a rate of application which inhibits growth of said undesirable plants and which does not adversely affect the growth of said established crop.

12 Claims, No Drawings

HERBICIDAL 3,1-DICHLOROANILIDES

This application is a division of application Ser. No. 31,253, filed May 24, 1960, which, in turn, was a continuation-in-part of Ser. No. 714,947, filed Feb. 13, 1958, both now abandoned.

This invention deals with the 3,4-dichloroanilides of propionic, isobutyric, and also α-methylvaleric acids. It has been discovered that these compounds possess marked herbicidal activity. Of these three new compounds, 3,4-dichloropropionanilide is outstandingly active, and while the other two anilides are somewhat less potent as herbicides, they nevertheless exhibit an unexpected level of such activity. There are other secondary differences which will be discussed below.

During the past years, there has been an intensified search for weedicides and herbicides. While various useful substances have been developed, there is still need for agents which have a better balance of properties or which exhibit special properties. For example, most of the currently utilized herbicides are primarily effective against dicotyledonous plants. Some compounds are highly toxic to all types of plants and thus lack the selectively and differential characteristics which are necessary for many applications. In meeting such needs, the present compounds provide a significant advance. The chemical literature contains reference to a number of monochloroanilides of monocarboxylic acids and also to 2,4-dichloropropionanilide. Shaw et al. examined 3-chloroisobutyranilide and 3-chloroacetanilide, and reported but slight herbicidal activity for this type of compound. Our studies have confirmed these findings.

We have also studied the action of 2,4-dichloroanilides and have found that, although the 2,4-dichlorophenyl group may be potent in certain kinds of molecular structures, it is markedly less active and desirable than our Novel N-3,4-dichlorophenyl carboxylic amides. Furthermore, we have found that the carboxylic amide groups which provide herbicidal activity are highly selective and specific.

It is clear, therefore, that herbicidally active agents in this field of chemistry cannot be predicted from the prior knowledge of compounds which have been demonstrated to exhibit herbicidal activities.

Objects of this invention include providing herbicidal agents which are active against a wide variety of plants, which are thus active at low concentrations and rates of application, and at concentrations and rates which provide differential and controllable effects, as through rate of application, time of application, or method of application. It is also an object to provide chemical substance which may be used to control weeds among established crops.

We have discovered specific compounds which meet the above objects and needs more nearly than previously known compounds. These are 3,4-dichloro-α-methylvaleranilide, 3,4-dichloroisobutyranilide, and 3,4-dichloropropionanilide, which anilides are active against a wide spectrum of plants and yet capable of differential applications.

A good process for preparing these compounds comprises taking up 3,4-dichloroaniline in a volatile, inert, organic solvent and reacting it with the appropriate carboxylic acid or its acid anhydride or its acid halide. In the last case, an alkaline reagent is supplied to take up the hydrogen halide split out. If the carboxylic acid is reacted, the mixture is heated under reflux with removal of water carried over by the azeotroping liquid.

The solvent is desirably a volatile naphtha, benzene, toluene, xylene, dichloroethane, dichloropropane, trichloroethane, or other volatile, inert hydrocarbon or chlorinated hydrocarbon.

With an acyl halide or anhydride, temperature of reaction may be from about 10° to 50° C. When carboxylic acid is used, reaction temperatures may vary from 50° to 150° C. and are conveniently controlled by heating the reaction mixture at reflux temperature.

Typical preparative procedures are shown in the following example, which is presented for purposes of illustration and not by way of limitation. Parts given are by weight unless otherwise designated.

PREPARATION 1

There are mixed 18 parts of 3,4-dichloroaniline and 130 parts of benzene. This mixture is stirred with 91 parts of an aqueous 22.5 percent sodium hydroxide solution and thereto is slowly added at about 25° to 30° C. 46.2 parts of propionyl chloride. External cooling is applied to control the temperature. The reaction mixture is stirred for an additional two hours and left standing to form layers. The organic layer is taken and diluted with about 250 parts by volume of octane. The product precipitates as a white solid. It is filtered off and dried to give 96 parts of 3,4-dichloropropionanilide melting at 91° C. It is recrystallized from aqueous alcohol and then melts at 92° to 93° C. By analysis the product contains 32.2 percent of chlorine (theory 32.4 percent).

The compounds of this invention may be applied to the plants to be treated from aqueous sprays or from dusts. Usually the rates of application are from about 0.5 lb. per acre to 20 lbs. per acre, depending in part upon such facts as formulation used, the type of application, the stage of growth, and the end result desired.

Aqueous sprays may be based on an emulsifiable concentrate or upon a wettable powder. A useful type of emulsifiable concentrate may be prepared from 25 parts of one or more of the 3,4-dichloroanilides of this invention, 40 to 50 parts of isophorone, 20 to 30 parts of an aromatic naphtha or xylene or toluene or mixtures of such solvents, and 2 to 10 parts of one or more solvent-soluble emulsifying agents. Small amounts of blending or coupling agents may be used to assist in forming a homogeneous solution, such as methanol, methoxyethanol, or butoxyethoxyethanol.

A typical useful emulsifier is prepared from 1 to 1.5 parts of calcium dodecylbenzene sulfonate or sodium dioctylsulfosuccinate, 2.5 to 4 parts of an octyl- or nonyl-phenoxypolyethoxy-ethanol together with about 0.5 to 1 parts of methanol and 0 to 0.5 part of xylene. The resulting mixture may be added to the above proportions of solvents and anilide or mixture of anilides. But other surface active agent or agents may be used.

The particular agent used is primarily a matter of choice and convenience. There may be used an anionic, cationic, or non-ionic emulsifying agent which is solvent-soluble. In place of the above-mentioned non-ionic agent derived from an alkylphenol and ethylene oxide, there may, for example, be used ethylene oxide condensates of long-chained alcohols, carboxylic acids, thiols, or amines. Compounds of all these types are available commercially. Also, non-ionic condensates of polyglycerols and fatty acids, or of polyglycerols, fatty acids, and a resin-forming acid, such as phthalic acid, find use in preparing self-emulsifying compositions. Typical anionic agents are based on alcohol sulfates or sulfonates, or sulfosuccinates. Solvent-soluble cationic surface active agents may be represented by oleylbenzyldimethylammonium chloride or dodecylbenzyltrimethylammonium chloride or bromide. As can be seen, the exact nature of the emulsifier is not critical, provided it is soluble in the solution of 3,4-dichloroanilide in one or more inert organic solvents.

A wettable powder may be prepared by taking up one of the 3,4-dichloroanilides of this invention in a volatile solvent, such as acetone, and applying it to finely divided solid, such as kaolin, pyrophyllite, or diatomaceous earth with evaporation of solvent. The powder is heated with small amounts of one or more wetting and dispersing agents. A typical formula is 20 parts of a 3,4-dichloroanilide of this invention, 77.5 parts of one or more finely divided solids, 0.5 part of a wetting agent such as an octylphenoxypolyethoxyethanol, and 2 parts of the sodium salt of condensed naphthaleneformaldehyde sulfonate.

Dusts containing 5 to 10 percent of active agent may be prepared by diluting such a wettable powder with finely divided solid carrier. If desired, the wetting agent, octylphenoxypolyethoxyethanol, may be omitted and the dispersing agent may be omitted or varied, as desired.

In any of the herbicidal compositions such as described above, there may be used an individual 3,4-dichloroanilide of this invention or a mixture of two or three of these. The compositions will include a carrier and in most cases a surface active agent.

A standard method for comparison of herbicidal agents as used in evaluating the compounds of our invention, related compounds, and other compounds, comprises planting crop and weed seeds in soil in flats, allowing the seed to germinate and the seedlings to develop, and treating the resulting plants with a spray or dust about two weeks after the seeds are planted. About two weeks later, the state of growth and the phytotoxic effects are evaluated. Sprays are applied usually at a standard carrier rate of 50 gallons per acre and the concentration of herbicidal agent varied to supply it at the desired rate; e.g. 1, 2, 3, 5 or 10 pounds per acre. In some tests the carrier rate may be varied, as to 10 or 20 gallons per acre, as would be practiced with highly dispersed sprays under high pressures. Carrier rates may also be increased if desired. The rate of application of agent appears to be the more critical factor, rather than merely the concentration. Comparisions may also be carried out in the field.

Monocotyledonous plants used in the present studies included crabgrass, foxtail, millet, wheat, ryegrass, wild oats, and Johnson grass.

Dicotyledonous plants used included beans, flax, pepper grass, plantain, lamb's quarter, chickweed, curly dock, pigweed, ragweed, scarlet pimpernel, and purslane.

When monocotyledonous plants were treated in the standard flats, kills of 98 and 99 percent respectively were obtained at the rates of 5 to 10 pounds per acre when 3,4-dichloropropionanilide was used as the agent and applied from liquid sprays. In comparison tests performed at the same time and under the same conditions, 2,5-dichloropropionanilide gave kills of 0 and 10 percent respectively at rates of 5 and 10 pounds per acre, while 2,4-dichloropropionanilide gave kills of 3 and 12 percent respectively at these rates. These data bring out the very unusual capacity of the 3,4-dichloroanilides of this invention to control monocotyledonous plants.

As might be expected, dicotyledonous plants are somewhat more sensitive to herbicidal agents in general. Thus, 2,5-dichloropropionanilide gave kills of 10 and 23 percent respectively at these same rates, while the 2,4-dichloropropionanilide gave kills of 15 and 20 percent respectively. In contrast, 3,4-dichloropropionanilide gave controls of 98 and 99 percent respectively at these same rates. Even against the more susceptible type of plants, it is clear that the 3,4-dichloropropionanilide is greatly more effective than the comparable 2,4-dichloroanilide and 2,5-dichloroanilide.

Comparisons were made for a series of 3,4-dichloroanilides of various monocarboxylic acids. The data summarizing results are presented in Table I.

They demonstrate the remarkable herbicidal action of the compounds of this invention and the highly selective action of these particular dichloro compounds.

TABLE I

| POST-EMERGENCE PHYTOTOXICITY AT RATE OF 1 LB./ACRE | | | | | |
|---|---|---|---|---|---|
| Compound | Crabgrass | Foxtail | Wild Oats | Millet | Mallow |
| $CH_3CONHC_6H_3Cl_2$-3,4 | 30 | 13 | 13 | 27 | 57 |
| $C_2H_5CONHC_6H_3Cl_2$-3,4 | 100 | 90 | 83 | 100 | 100 |
| $i$-$C_3H_7CONHC_6H_3Cl_2$-3,4 | 90 | 75 | 88 | 100 | 93 |
| $n$-$C_3H_7CONHC_6H_3Cl_2$-3,4 | 43 | 13 | 10 | 52 | 95 |
| $C_3H_7CH(CH_3)CONHC_6H_3Cl_2$-3,4 | 100 | 93 | 100 | 95 | 90 |

Comparisons were also made of the activities of the 3,4-dichloroanilides of this invention against activities of 3-chloropropionanilide, 4-chloropropionanilide, 3-chloroisobutyranilide, and 4-chloroisobutyranilide. Test data are summarized in Table II. They show the remarkable effectiveness of the dichloroanilides of this invention against a variety of typical plants. They also show that monochloro analogues are much less effective. It might be connected that the 3- or 4-chloro-α-methylvaleranilides are much less active than the other monochloroanilides, data for which are given in Table II, and their activities are too low to be of any significance.

TABLE II

POST-EMERGENCE PHYTOTOXICITY AT RATE OF 1 LB./ACRE

| Compound | Sorghum | Crabgrass | Foxtail | Wild Oats | Millet | Mallow |
|---|---|---|---|---|---|---|
| $C_2H_5CONHC_6H_4Cl-3$ | 10 | 3 | 3 | 7 | 7 | 22 |
| $C_2H_5CONHC_6H_4Cl-4$ | 20 | 43 | 17 | 17 | 36 | 50 |
| $C_2H_5CONHC_6H_3Cl_2-3,4$ | 92 | 100 | 90 | 83 | 100 | 100 |
| $i\text{-}C_3H_7CONHC_6H_4Cl-3$ | 30 | 27 | 13 | 17 | 25 | 40 |
| $i\text{-}C_3H_7CONHC_6H_4Cl-4$ | 27 | 40 | 13 | 17 | 33 | 57 |
| $i\text{-}C_3H_7CONHC_6H_3Cl_2-3,4$ | 88 | 90 | 75 | 88 | 100 | 93 |
| $C_3H_7CH(CH_3)CONHC_6H_3Cl_2-3,4$ | 90 | 100 | 93 | 100 | 95 | 50 |

The effective weedicidal action of 3,4-dichloropropionanilide, 3,4-dichloroisobutyranilide, and 3,4-dichloro-α-methylvaleranilide is also established by data obtained in the field. When these compounds are applied from aqueous sprays to weeds which have supported from 1 to 3 weeks prior to treatment, excellent control is obtained at rates of 1 to 6 pounds per acre for both monocotyledonous and dicotyledonous plants.

Another study under field conditions has been concerned with control of annual grasses and weeds growing among perennial grasses using 3,4-dichloropropionanilide. At suitable rates, such as one to two pounds per acre, it was observed that the annual grasses and weeds can be controlled without injury to the perennial grasses. This makes it possible to control crabgrass, foxtail, chickweed, and the like in established lawns.

In field tests, it was also demonstrated that weeds can be controlled in perennial legumes. Sprays applied to dormant alfalfas and clovers in fall, winter, and early spring effectively destroy undesired grasses and weeds without any permanent harm to the desired plants, rates of one to six pounds per acre in 50 gallons of spray being used.

In an orchard in which clover was used as a ground cover there was applied a spray of 3,4-dichloropropionanilide at the rate of two pounds per acre. Weeds of many types, including particularly chickweed and also foxtail, were controlled. There was some defoliation of the clover, but this was only temporary, new leaves soon appearing.

A strawberry bed was sprayed after the close of the picking season, the compound of this invention being used at one and two pounds per acre. Weeds were controlled without evidence of injury to the established strawberry plants. Weeds controlled included crabgrass, foxtail, pigweed, lamb's quarter, smart weed, and ragweed.

A potato patch was sprayed two weeks after the final cultivation with aqueous sprays of the compound of this invention at rates of 2, 4 and 6 pounds per acre, these weights of compounds being used in 50 gallons of water. Excellent control of weeds was provided without any damage to the established potato plants. Harvested potato tubers were of excellent yield and quality.

Sprays at 2, 4 and 6 pounds per acre were similarly applied to established tomato plants about the middle of July. The tomato plants continued to grow and mature without weeds being present, even up to the middle of September. At rates of 2 to 4 pounds per acre, there was no more than slight injury to the tomato plants. At 6 pounds per acre, there may be some slight injury shortly after the plots were sprayed, but this is not permanent.

Typical test data relating to the control of weeds in field-grown tomatoes are presented in Table III. Plots were sprayed on July 12 at the indicated rates. Counts of weeds were made on September 13 and compared with weeds on unsprayed control plots.

TABLE III

WEED CONTROL IN TOMATO PLOTS

| Compound | Appln. Rate | Crabgrass | Foxtail | Barnyard Grass | Pigweed |
|---|---|---|---|---|---|
| $C_2H_5CONHC_6H_3Cl_2-3,4$ | 2 lb./A | 100 | 90 | 90 | 97 |
| $C_2H_5CONHC_6H_3Cl_2-3,4$ | 4 lb./A | 100 | 100 | 100 | 100 |

| Compound | Appln. Rate | Lamb's Quarter | Ragweed | Smartweed | Purslane |
|---|---|---|---|---|---|
| $C_2H_5CONHC_6H_3Cl_2-3,4$ | 2 lb./A | 95 | 93 | 100 | 95 |
| $C_2H_5CONHC_6H_3Cl_2-3,4$ | 4 lb./A | 100 | 100 | 100 | 100 |

The 3,4-dichloroanilide of this invention can be effectively used for control of annual weeds in such crops as corn, potatoes, tomatoes, sugar cane, and pineapples.

The 3,4-dichloroanilides of this invention can be used to eliminate growing plants generally by applying 3,4-dichloroanilide at 10 to 50 pounds per acre. Such treatments are useful in preparing areas for capping with asphalt mixes, for example. On the other hand, these compounds can be used for selective control of undesirable plants. If the undesirable plants are in a tender or succulent state, they can be eliminated without destroying established plants in the same area. If directed sprays are used between established plants, weeds can be controlled over a wide range of rates of application, as from 1 to 10 pounds per acre. On the other hand, general applications can also be made, and at safe rates; such as 0.5 to 6 pounds per acre, with selective action.

Of the three compounds set forth in this application, 3,4-dichloropropionanilide, 3,4-dichloroisobutyranilide, and 3,4-dichloro-α-methylvaleranilide, only 3,4-dichloropropionanilide has proven to be uniquely selective insofar as its effect on rice is concerned. Greenhouse tests on rice and the monocots and dicots set forth hereinafter have provided the data set forth in Table IV.

In the table, the rice injury rating is based on a 0 to 10 scale with 10 equal to complete kill. Each anilide was applied to a group of six monocot species (sudan, millet, barnyard grass, crabgrass, orchard grass and foxtail) and seven dicot species (pigweed, curly dock, Indian mallow, mustard, chickweed, sorrel, and lamb's quarter) at application rates of ½, 1, 2 and 4 lb./A (pounds per acre). The percent phytotoxicity values given in the table were obtained by averaging the herbicidal activity on all species (monocot and dicots separately) at the four application rates. Consequently, a considerable amount of data is summarized in the values and, therefore they can be considered as highly reliable measures of the hermicidal activity of the compounds. These data show the remarkable and completely unexpected specificity of 3,4-dichloropropionanilide insofar as non-phytotoxicity to the rice and high phytotoxicity to the undesired weeds and grasses are concerned. It should be noted that even at applications far in excess of those necessary to effect very efficient control of the undesired weeds and grasses, there is only negligible injury to the rice. Thus, at 8 pounds per acre, at least twice the application rate necessary for weed and grass control, there is only 10 percent rice injury. Whereas 3,4-dichloroisobutyranilide and 3,4-dichloro-α-methylvaleranilide effect efficient control of the undesired weeds and grasses, they cause much too high rice injury and could not be used to control undesired plant growth in rice.

We claim:

1. A method for selectively inhibiting growth of undesirable plants in an area containing growing undesirable plants in an established crop, which comprises applying to said area 3,4-dichloropropionanilide at a rate of application which inhibits growth of said undesirable plants and which does not adversely affect the growth of said established crop.

2. The method according to claim 1 wherein the 3,4-dichloropropionanilide is applied in a composition comprising 3,4-dichloropropionanilide and an inert diluent therefor at a rate of between 0.5 and 6 pounds of 3,4-dichloropropionanilide per acre.

3. The method according to claim 1 wherein most of the undesirable plants are destroyed by the 3,4-dichloro-propionanilide applied thereto without substantial adverse effect on the crop growing therewith.

4. The method according to claim 1 wherein the established crop is tomatoes.

5. The method according to claim 1 wherein the established crop is potatoes.

6. The method according to claim 2 wherein the established crop is monocotyledonous.

7. The method according to claim 2 wherein the established crop is dicotyledonous.

8. The method according to claim 2 wherein the undesirable plants include monocotyledonous plants.

9. The method according to claim 2 wherein the undesirable plants include dicotyledonous plants.

10. The method according to claim 2 wherein the established crop is a grain crop.

11. The method according to claim 2 wherein the undesirable plants include barnyardgrass.

TABLE IV

| COMPOUND | RICE INJURY RATING APPLICATION RATE-LB/A | | | | | % PHYTOTOXICITY MONOCOTS | DICOTS |
|---|---|---|---|---|---|---|---|
| | 1 | 2 | 4 | 6 | 8 | | |
| 3,4-dichloropropion-anilide | 0 | 0 | 0 | 0.5 | 1.0 | 77 | 96 |
| 3,4-dichloroisobutyran-ilide | 2 | 3 | 6 | 7 | 9 | 70 | 92 |
| 3,4-dichloro-α-methyl-valeranilide | 6 | 7 | 10 | 10 | 10 | 83 | 100 |

The structural formula of 3,4-dichloropropionanilide is

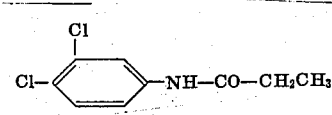

The compound can also be named N(3,4-dichlorophenyl)propanamide, N(3,4-dichlorophenyl)-propionamide or 3',4'-dichloropropionanilide.

12. A method for selectively inhibiting the growth of growing, tender, undesirable, annual plants which are susceptible to 3,4-dichloropropionanilide, said undesirable plants growing in an area containing an established monoctoyledonous crop which is resistant to 3,4-dichloropropionanilide, which comprises applying to said undesirable plants a composition comprising 3,4-dichloropropionanilide and an inert carrier therefor at a rate of application which inhibits growth of said undesirable plants and which does not substantially affect the growth of said established monocotyledonous crop.

* * * * *

UNITED STATES PATENT OFFICE
CERTIFICATE OF CORRECTION

Patent No. 3,816,092  Dated June 11, 1974

Inventor(s) Harold F. Wilson and Dougal H. McRae

It is certified that error appears in the above-identified patent and that said Letters Patent are hereby corrected as shown below:

Page 1, the title should read -- HERBICIDAL 3,4-DICHLOROANILIDES --

Page 1, line 3 "McRay" should read -- McRae --.

Page 1, line 6 under "OTHER PUBLICATIONS", "Reilstein" should read -- Beilstein --.

Col. 1, the title should read -- HERBICIDAL 3,4-DICHLOROANILIDES --

Col. 1, line 38 "Novel" should read -- novel --.

Col. 1, line 53 "may" should read -- can --.

Col. 2, line 19 "18" should read -- 81 --.

Col. 3, line 16 after "to" insert -- a --.

Columns 3 and 4 in Table I, the results given for the last compound should read -- 90    100    93    100    95 -- and the number "90" appearing under the last compound in Table I should be deleted.

Col. 3, line 1 under Table I "seed" should read -- seeds --.

Col. 4, line 12 "to" should read -- and --.

Col. 4, line 63 "connected" should read -- commented --.

Columns 5 and 6 in Table II, the results given for the last compound should read -- 50    90    100    93    100    95 -- and the number "50" appearing under the last compound in Table II should be deleted.

UNITED STATES PATENT OFFICE
CERTIFICATE OF CORRECTION   Page 2

Patent No. 3,816,092                    Dated  June 11, 1974

Inventor(s)  Harold F. Wilson and Dougal H. McRae

It is certified that error appears in the above-identified patent and that said Letters Patent are hereby corrected as shown below:

Col. 5, line 17 "supported" should read -- sprouted --.

Col. 6, line 20 "to" should read -- and --.

Col. 6 in Table III, lower entries, the word "Rate" should appear under "Appln."

Col. 6, lines 47 and 48 "tomatoes, sugar cane, and pineapples." should read -- tomatoes, and sugar cane. --

Col. 7, line 17 "hermicidal" should read -- herbicidal --.

Claim 3, line 3 "dichloro-propionanilide" should read -- dichloropropionanilide --.

Signed and sealed this 5th day of November 1974.

(SEAL)
Attest:

McCOY M. GIBSON JR.
Attesting Officer

C. MARSHALL DANN
Commissioner of Patents